(No Model.) 3 Sheets—Sheet 1.
P. P. MAST, G. W. STARTZMAN & D. L. CLARK.
TONGUELESS CULTIVATOR.
No. 312,738. Patented Feb. 24, 1885.
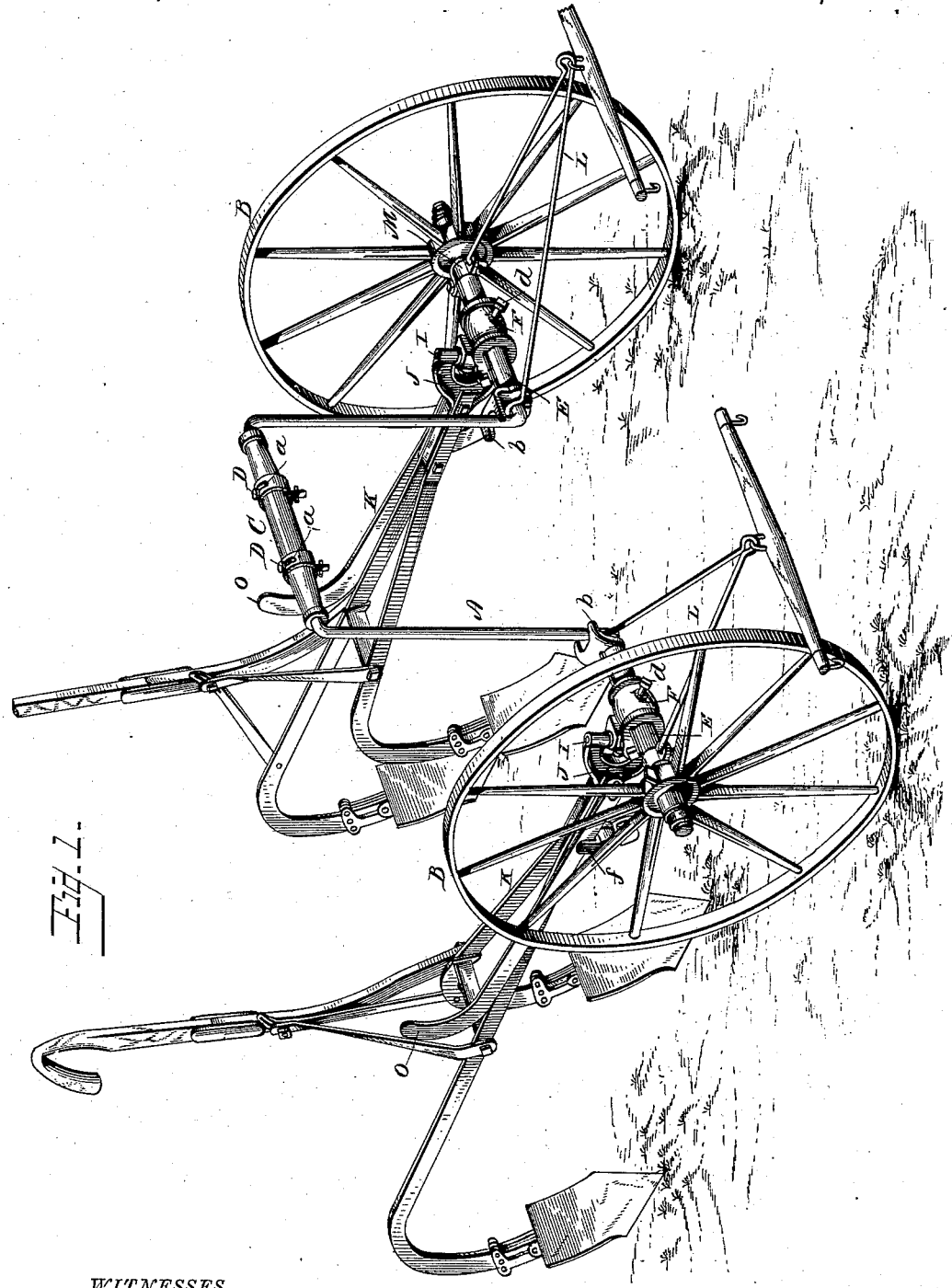

(No Model.) 3 Sheets—Sheet 2.
P. P. MAST, G. W. STARTZMAN & D. L. CLARK.
TONGUELESS CULTIVATOR.
No. 312,738. Patented Feb. 24, 1885.
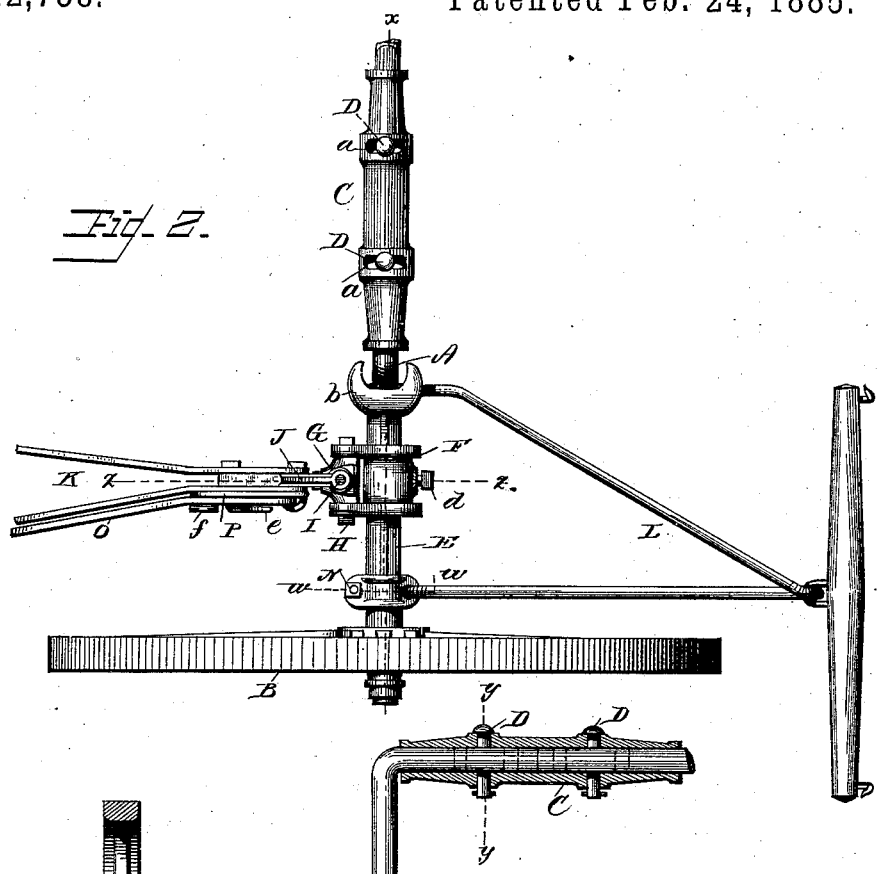
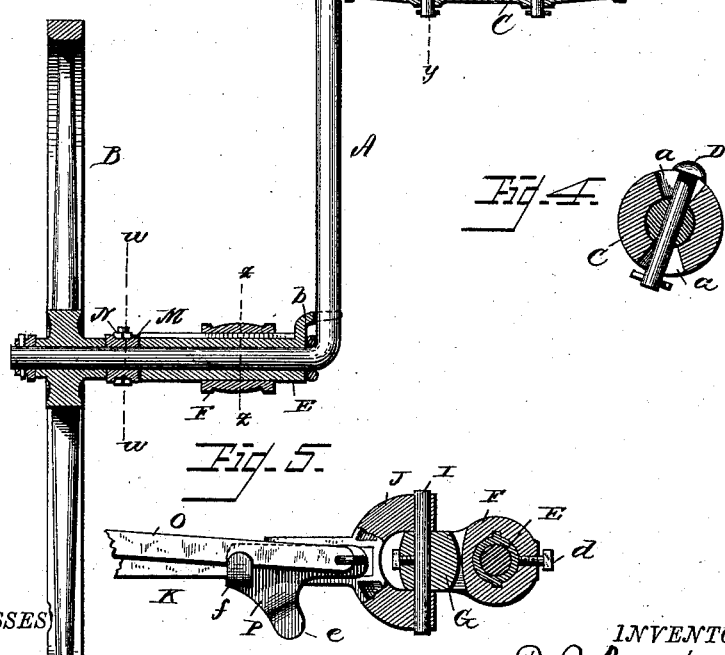
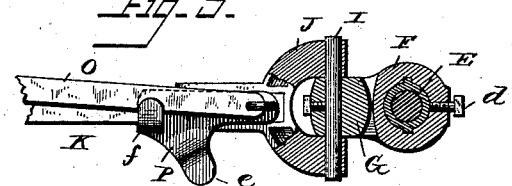
WITNESSES
Wm L Snider
W. H. Shipley
INVENTOR
P. P. Mast
G. W. Startzman
D. L. Clark
By P. T. Dodge, Attorney (No Model.) 3 Sheets—Sheet 3.
P. P. MAST, G. W. STARTZMAN & D. L. CLARK.
TONGUELESS CULTIVATOR.
No. 312,738. Patented Feb. 24, 1885.
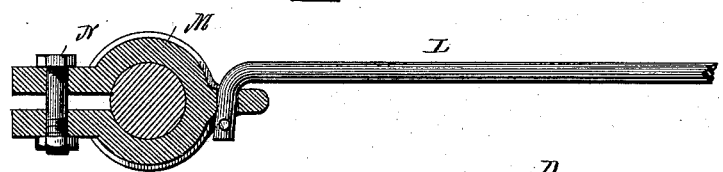
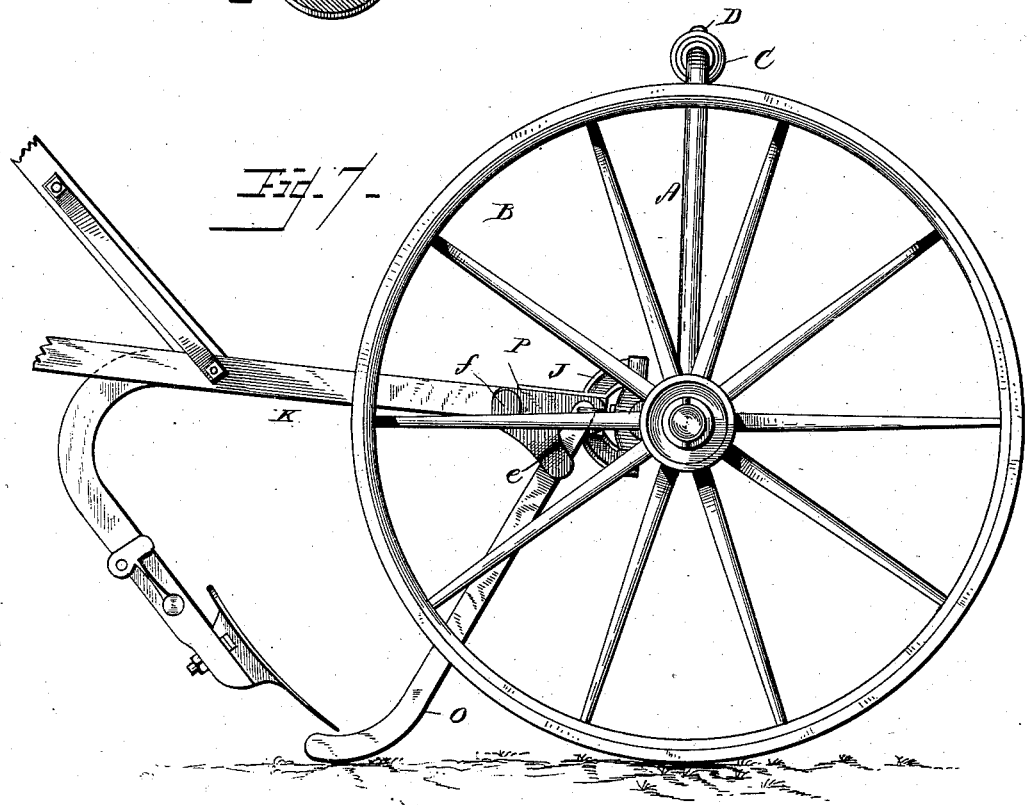
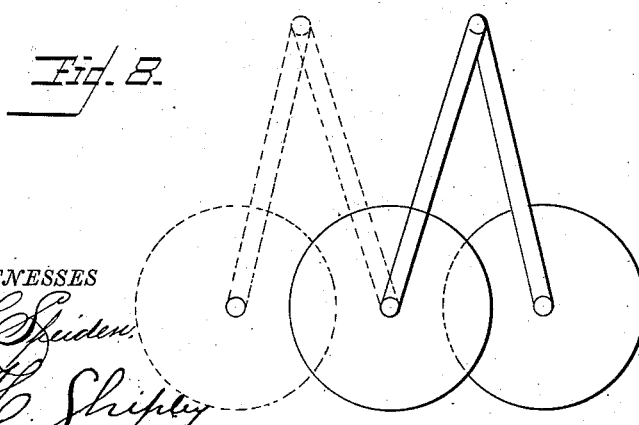

UNITED STATES PATENT OFFICE.

PHINEAS P. MAST, GEORGE W. STARTZMAN, AND DEVOLSON L. CLARK, OF SPRINGFIELD, OHIO, ASSIGNORS TO P. P. MAST & COMPANY.

TONGUELESS CULTIVATOR.

SPECIFICATION forming part of Letters Patent No. 312,738, dated February 24, 1885.

Application filed September 8, 1884. (No model.)

*To all whom it may concern:*

Be it known that we, PHINEAS P. MAST, GEO. W. STARTZMAN, and DEVOLSON L. CLARK, of Springfield, in the county of Clark and State of Ohio, have invented certain Improvements in Tongueless Cultivators, of which the following is a specification.

This invention has reference to that class of implements commonly known in the art as "parallel tongueless cultivators," in which two shovel-carrying beams or drag-bars are connected at their forward extremities to opposite ends of an arched axle or frame carried by wheels or runners with which draft devices are connected in such manner that the power of a draft-animal is applied directly to the propulsion of each beam.

It is the aim of the present invention to provide an implement in which the beams shall have a free forward and backward motion independently of each other without changing the distance between them, and in which the axle and draft devices shall be maintained at all times in such manner as to prevent them from falling to the ground.

It is further the object of the invention to permit the convenient adjustment of the beams to and from each other, and to avoid the danger of breakage incident to machines of the ordinary construction.

Referring to the accompanying drawings, Figure 1 represents a perspective view of the improved machine. Fig. 2 is a top plan view of one side of the machine. Fig. 3 is a vertical section on the line $xx$ of Fig. 2 on a plane passing lengthwise through the main axle. Fig. 4 is a cross-section on the line $yy$, Fig. 3, showing the coupling by which the two portions of the divided axle are united. Fig. 5 is a longitudinal vertical section on the line $zz$ of Figs. 2 and 3, showing the construction of the adjustable coupling by which the beams are attached to the axle. Fig. 6 is a cross-section on the line $ww$ of Figs 2 and 3, showing the clamp by which the draft devices are connected firmly to the axle and properly sustained. Fig. 7 is a side elevation representing the manner in which the beams are carried when out of action; Fig. 8, a diagram illustrating the independent movements of the opposite ends of the axle with their wheels and attendant parts.

Referring to the drawings, A represents the main axle, having horizontal outer ends to receive the two supporting-wheels B, and an arched central portion. The axle is divided transversely at its middle into two parts, which are united by means of a coupling-sleeve, C, and pins D, passing through the respective ends of the axle and through transverse slots $a$, formed in the ends of the sleeve, as shown in Figs. 1 and 4. This arrangement prevents end motion of the parts, but allows the ends of the axle to turn within the sleeve independently of each other, so that their upright portions may assume inclined positions and allow their wheels to move forward and backward independently of each other, as indicated in Figs. 7 and 8. This independent motion of the two parts of the axle and their wheels is limited by the pins D encountering the ends of the slots in the coupling-sleeve in the manner represented in Fig. 4. Each end of the axle is provided with two or more holes in that portion which enters the coupling-sleeve, so that by shifting the coupling-pins from one hole to another the length of the axle and consequently the distance between the wheels may be varied as circumstances may demand.

In practice it is found that the coupling consisting of the slotted sleeve and pins is peculiarly advantageous by reason of its simplicity and of its great strength, whereby it is adapted to withstand the violent strain to which it is subjected.

On each end of the axle, between the wheel and the upright portion thereof, there is mounted a loose sleeve or tube, E, having at the end next to the upright portion of the axle an upturned arm, $b$, the upper end of which is forked or notched to embrace the upright portion of the axle, as shown in the various figures. This notched arm serves (the sleeve being held against rotation as hereinafter described) to limit the rotary motion of the axle within the sleeve, and thus to limit the inclination of the upright portion of the axle in a forward or backward direction. It will be seen, therefore, that the independent forward and backward movement of the two ends of the axle is limited not only by the coupling-sleeve C, but also by the sleeves E. This is an important feature of the invention, since the sleeves E are thus caused to relieve the coupling-sleeve C of a portion of the strain to which it would otherwise be subjected in the event of one animal attempting to move a long distance in advance of the other. The division of these strains between the upper and lower sleeves, or, in other words, the adaptation of the sleeves E to re-enforce or assist the sleeve C, enables the plow to withstand the strains which commonly disable those of the ordinary construction, in which the entire strain is received by the coupling at the top.

Around each of the sleeves E there is mounted a sleeve or head, F, adjustable lengthwise thereof, and secured by means of a set-screw, d. This sleeve F is provided with two rearwardly-extending ears, between which there is mounted a rolling block, G, sustained by a horizontal pivot, H. This block has a limited rolling motion about its pivot, the motion being limited in a downward direction by the lower edge of the block encountering the rear face of its supporting-head F in the manner plainly represented in Fig. 5, for the purpose which will be presently explained.

To the rolling block G there is connected, by a vertical pivot, I, a forked draft-head, J, to which the shovel-beams or drag-bars K are attached in the ordinary manner, either in pairs, as represented in the drawings, or singly, if preferred, both arrangements being familiar to those skilled in the art. The pivot I permits the draft head and beam to swing laterally, as may be required, in order that the shovels may follow the line of the plants. The pivot H admits of the draw-head and its block rolling vertically, in order to admit of the beams being lifted to raise the shovels from the ground.

When the beams are in an operative position, the lower face or shoulder of the block G is in contact with the face of the head F, as before explained, forming a knuckle-joint. This action prevents the head F from rolling forward, and as this head is in turn secured to the sleeve E, it prevents the latter from turning forward, and thus the sleeve E is fixed against forward rotation, whereby its upright arm b is caused to maintain the arched portion of the axle in an upright position, so that it cannot swing either forward or backward to a sufficient extent to fall to the ground.

It will be perceived that the essence of the invention in this regard consists in establishing between the beams and the arched portion of the axle a connection which will sustain the arched portion in an upright position, and it will be manifest to the skilled mechanic that the details of the invention may be modified in this regard without departing from the limits of the invention. This is an important feature, in that it prevents the annoyance and the dangers which commonly occur from the axle turning over when the machine is relieved from the action of the draft devices. In the ordinary machines of this type the axle is sustained in the upright position by the draft devices, and consequently the cessation of the draft permits the axle to fall.

Referring now to the draft devices, it will be seen that each consists of a rod, L, bent to a V form, one end being coiled into an eye, which is clasped around the axle between the end of the sleeve E and the upturned portion of the axle, and the opposite end of which is bent downward and passed through a projection on a collar, M, secured firmly to the axle between the outer end of the sleeve E and the wheel.

As shown in Fig. 6, the collars M are divided on one side and drawn together by means of a bolt, N, whereby they are contracted firmly upon the axle and fixed against rotation thereon. The axle having a very limited rotation, as before explained, restricts the forward rotation of the collar M accordingly, and thus the collar is caused to sustain the draft device in an elevated or operative position, so as to prevent it from falling to the ground or encountering the heels of the draft-animals.

From the foregoing it will be perceived that by this construction there is produced a machine in which the axle and the draft devices are at all times held clear of the ground, and this when the machine is standing idle as well as when it is in action.

For the purpose of sustaining the shovels clear of the ground in moving the machine from place to place, adjustable runners or supporting-arms O are provided, one of which is jointed to the forward end of each beam in such manner that it may swing vertically. To the side of the beam or its draft-head there is bolted firmly a plate, P, having a vertically-grooved lip, e, at the lower edge, and a corresponding lip, f, at the upper edge. When the plow is in action, the runner O is lifted and laid within the lip f, and carried idly therein at the side of the beam. When, however, the shovels are to be sustained clear of the ground, the runner is lifted from the upper lip, its end dropped upon the ground, and the beam elevated until the lower lip, e, is seated on top of the runner, as represented in Fig. 7, in which position of the parts the runner riding in the ground will serve to carry the beam, as shown.

Having thus described the invention, what is claimed is—

1. In a tongueless cultivator, the divided arched axle, in combination with the coupling adapted, as described, to permit a limited independent motion of the two parts, and the arms b, connected with the plow-beams, and adapted, as described, to limit the rocking motion of the axle both in a forward and a backward direction, whereby the axle is maintained in an upright position.

2. In a tongueless cultivator, the arched jointed axle and its sustaining-wheels, in combination with the shovel-beams, and the coupling-sleeves provided with the arms $b$, permitting a limited independent motion of the axle, and the knuckle-joints connecting the sleeves and beams, as described.

3. The arched jointed axle and its sustaining-wheels, in combination with a sleeve, E, having arms $b$, the block G, connected with said sleeve through the medium of a knuckle-joint limiting its downward motion, and the draft-head J, connected with the block G by a vertical pivot, whereby the beams are permitted to swing both vertically and laterally, but caused to limit the swinging motion of the axle.

4. The arched jointed axle and its sustaining-wheels, in combination with the sleeve E, having arms or shoulders to loosely engage the axle, the head F, movable lengthwise upon the sleeve, but fixed against rotation thereon, the block G, connected to the head by a horizontal pivot, and the draft-head J, connected to the block by a vertical pivot.

5. In a tongueless cultivator, the arched jointed axle and its sustaining-wheels, combined with the drag-bars, arms $b$, connected with the drag-bars and engaging the axle to limit the tipping motion of its upright portion, and collars fixed rigidly upon the axle and arranged to sustain the draft devices clear of the ground, substantially as described.

6. In combination with the plow-beam and the supporting arm or runner therefor, the plate provided with the lips or shoulders at its upper and lower edges to engage the runner.

PHINEAS P. MAST.
GEO. W. STARTZMAN.
DEVOLSON L. CLARK.

Witnesses:
J. D. HURD,
C. C. KIRKPATRICK.